United States Patent
Miedema

(10) Patent No.: US 12,464,050 B2
(45) Date of Patent: Nov. 4, 2025

(54) METHODS, DEVICES, AND SYSTEMS TO GENERATE A REDUCED CONFIGURATION IN A MICROSERVICE ARCHITECTURE

(71) Applicant: CIENA CORPORATION, Hanover, MD (US)

(72) Inventor: David Miedema, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 3 days.

(21) Appl. No.: 18/194,969

(22) Filed: Apr. 3, 2023

(65) Prior Publication Data
US 2024/0333808 A1   Oct. 3, 2024

(51) Int. Cl.
*H04L 67/00*   (2022.01)
*H04L 41/085*   (2022.01)

(52) U.S. Cl.
CPC ............ *H04L 67/34* (2013.01); *H04L 41/085* (2013.01)

(58) Field of Classification Search
CPC ......... H04L 67/00; H04L 67/34; H04L 67/51; H04L 41/085; G06F 9/547; G06F 9/4416; G06F 9/44526; G06F 16/148; G06F 8/60; G06F 8/70; G06F 8/71
USPC ........................................................ 709/203
See application file for complete search history.

(56) References Cited

U.S. PATENT DOCUMENTS

| 11,733,987 | B2 * | 8/2023 | Mahajan | H04L 67/10 |
| | | | | 717/177 |
| 2019/0130004 | A1 * | 5/2019 | Singh | G06F 16/283 |
| 2019/0243665 | A1 * | 8/2019 | Bolik | G06F 8/60 |
| 2019/0339965 | A1 * | 11/2019 | Garvey | G06F 16/24578 |
| 2020/0117434 | A1 * | 4/2020 | Biskup | G06F 9/445 |
| 2020/0326915 | A1 * | 10/2020 | Retting | G06F 8/24 |
| 2021/0075887 | A1 * | 3/2021 | Pavlin | G06N 20/00 |
| 2021/0109978 | A1 * | 4/2021 | Libby | G06F 9/547 |
| 2021/0117249 | A1 * | 4/2021 | Doshi | G06F 9/547 |
| 2021/0192533 | A1 * | 6/2021 | Lee | G06F 16/9024 |
| 2021/0200609 | A1 * | 7/2021 | Petersen | G06F 9/546 |
| 2021/0334384 | A1 * | 10/2021 | Ranjan | G06F 11/3636 |
| 2022/0109741 | A1 * | 4/2022 | Chen | H04L 69/40 |
| 2022/0121470 | A1 * | 4/2022 | Saxena | H04L 63/20 |

(Continued)

OTHER PUBLICATIONS

Bjorklund, M., et al., "NETCONF Extensions to Support the Network Management Datastore Architecture", Internet Engineering Task Force (IETF), ISSN: 2070-1721, Mar. 2019, 23 pp.

*Primary Examiner* — James N Fiorillo
(74) *Attorney, Agent, or Firm* — Guntin & Gust, PLC; Atanu Das

(57) ABSTRACT

Aspects of the subject disclosure may include, for example, receiving user-generated input. The user-generated input initiates a request for a first reduced configuration associated with a group of services to a client computing device associated with a user. Further embodiments can include obtaining a merged configuration associated with the group of services, obtaining staged system data associated with the group of services, and generating the first reduced configuration based on the merged configuration and the staged system data. Additional embodiments can include transmitting the first reduced configuration to the client computing device, wherein the client computing device presents the first reduced configuration on a display associated with the client computing device to the user. Other embodiments are disclosed.

20 Claims, 13 Drawing Sheets

(56) References Cited

U.S. PATENT DOCUMENTS

| | | | |
|---|---|---|---|
| 2022/0164221 A1* | 5/2022 | Antemijczuk | G06F 9/546 |
| 2022/0360504 A1* | 11/2022 | Kairali | H04L 41/0816 |
| 2022/0385535 A1* | 12/2022 | Verma | G06F 8/61 |
| 2022/0405092 A1* | 12/2022 | Miedema | G06F 8/60 |
| 2023/0065530 A1* | 3/2023 | Mohanty | G06F 11/3608 |
| 2023/0143885 A1* | 5/2023 | Day, Jr. | G06F 16/24547 |
| | | | 707/737 |
| 2023/0177426 A1* | 6/2023 | Sailer | G06F 8/22 |
| | | | 717/102 |
| 2023/0229412 A1* | 7/2023 | Paravatha | G06F 8/36 |
| | | | 715/771 |
| 2023/0273845 A1* | 8/2023 | Whitfield | G06F 16/148 |
| | | | 709/217 |
| 2023/0403543 A1* | 12/2023 | Pateromichelakis | H04W 24/02 |
| 2024/0103896 A1* | 3/2024 | Jiang | G06F 16/21 |
| 2024/0143493 A1* | 5/2024 | Michael | G06F 9/5077 |
| 2024/0236197 A1* | 7/2024 | Kairali | G06N 20/00 |
| 2024/0241715 A1* | 7/2024 | Shpilyuck | G06F 8/65 |
| 2024/0261692 A1* | 8/2024 | Sliwka | H04L 9/3213 |
| 2024/0305538 A1* | 9/2024 | Lemler | H04L 41/0883 |

\* cited by examiner

200a
- User Configuration
    - create monitor port 3

200b
- Staged System Data
    - create monitor port 3 min-power 3 max-power 10 state enabled alarming enabled 200c
- Final Configuration (Merged Configuration)
    - monitor
        - port 3
        - min-power 3
        - max-power 10
        - state enabled
        - alarming enabled

210a
- User Configuration
    - create monitor port 3 min-power 5 state disabled 210b
- Staged System Data
    - create monitor port 3 min-power 3 max-power 10 state enabled alarming enabled 210c
- Final Configuration (Merged Configuration)
    - monitor
        - port 3
        - min-power 5
        - max-power 10
        - state disabled
        - alarming enabled 210d
- Merged Configuration
    - monitor
        - port 3
        - min-power 5
        - max-power 10
        - state disabled
        - alarming enabled 210e
- Staged System Data
    - create monitor port 3 min-power 3 max-power 10 state enabled alarming enabled 210f
- Reduced Configuration (Unmerged Configuration)
    - monitor
        - port 3
        - min-power 5
        - state disabled

220a
- Merged Configuration
    - monitor
        - port 3
        - min-power 5
        - max-power 10
        - state disabled 220b
- Staged System Data
    - create monitor port 3 alarming enabled 220c
- Reduced Configuration
    - monitor
        - port 3
        - min-power 5
        - ~~max-power 10~~
        - state disabled 230a
- User Configuration
    - create card slot 1 part-no ABC123

230b
- Staged System Data
    - create card slot 1 monitor port 3 min-power 3 max-power 10 state enabled alarming enabled
    - create card slot 1 monitor port 4 min-power 4 max-power 11 state enabled alarming enabled 230c
- Final Configuration (Merged Configuration)
    - card
        - slot 1
        - part-no ABC123
        - monitor
            - port 3
            - min-power 5
            - max-power 10
            - state disabled
            - alarming enabled
        - monitor
            - port 4
            - min-power 4
            - max-power 11
            - state disabled
            - alarming enabled 230d
- Merged Configuration
    - card
        - slot 1
        - part-no ABC123
        - monitor
            - port 3
            - min-power 5
            - max-power 10
            - state disabled
            - alarming enabled
        - monitor
            - port 4
            - min-power 4
            - max-power 11
            - state disabled
            - alarming enabled 230e
- Staged System Data
    - card
        - slot 1
        - monitor
            - port 3
            - min-power 5
            - max-power 10
            - state disabled
            - alarming enabled
        - monitor
            - port 4
            - min-power 4
            - max-power 11
            - state disabled
            - alarming enabled 230f
- Reduced Configuration
    - card
        - slot 1
        - part-no ABC123

240a
- Merged Configuration
    - card
        - slot 1
        - part-no ABC123
        - monitor
            - port 3
            - min-power 10
            - max-power 20
            - state enabled
            - alarming enabled
        - monitor
            - port 4
            - min-power 4
            - max-power 11
            - state disabled
            - alarming disabled

240b
Staged System Data
- card
    - slot 1
    - monitor
        - port 3
        - min-power 5
        - max-power 10
            - state disabled
        - alarming enabled
    - monitor
        - port 4
        - min-power 4
        - max-power 11
        - state disabled
        - alarming enabled

240c
- Reduced Configuration
    - card
        - slot 1
        - part-no ABC123
        - monitor
            - port 3
            - min-power 10
            - max-power 20
            - state enabled
        - monitor
            - port 4
            - alarming disabled

METHODS, DEVICES, AND SYSTEMS TO GENERATE A REDUCED CONFIGURATION IN A MICROSERVICE ARCHITECTURE

FIELD OF THE DISCLOSURE

The subject disclosure relates to methods, devices, and systems to generate a reduced configuration in a microservice architecture.

BACKGROUND

In a microservice architecture, configurations for a microservice or a group of microservices can be supplied by a user, or by the system implementing the microservice(s), or a combination of both. These configurations are "declared" via declarative configuration to be the final target for the system and the system can validate and accept this configuration.

Some implementations allow for the portions of the user-defined configuration to be separated from the system-defined configuration. This allows the complete configuration to be a merger of both the user-defined configuration and the system-defined configuration. However, this implementation has an impact on how the client computing device manages the configuration and is not widely adopted.

Another implementation for managing user defined and system-defined configuration contributions includes staging. Staging allows the system to amend a user request with a user-defined configuration with additional content/configuration to be validated and committed at the same time. All system-defined configuration contributions from staged system data are added to the user-defined configuration and merged together. This is done recursively across multiple services so the system can continue to expand the configuration until a complete configuration has been determined.

One main advantage with staging is also its drawback—it mixes the user—defined configuration with the system-defined configuration from the staged system data. This allows the whole configuration to be validated and committed together, but it also means that the merged configuration that a user views via the client computing device is inflated with system level details that they did not provide and can be cumbersome to view/manage by the user.

BRIEF DESCRIPTION OF THE DRAWINGS

Reference will now be made to the accompanying drawings, which are not necessarily drawn to scale, and wherein:

FIGS. 1A, 1B, 2A, 2B, 2C, 2D, and 2E are block diagrams illustrating example, non-limiting embodiments of a system functioning in accordance with various aspects described herein.

DETAILED DESCRIPTION

Figure 1A:
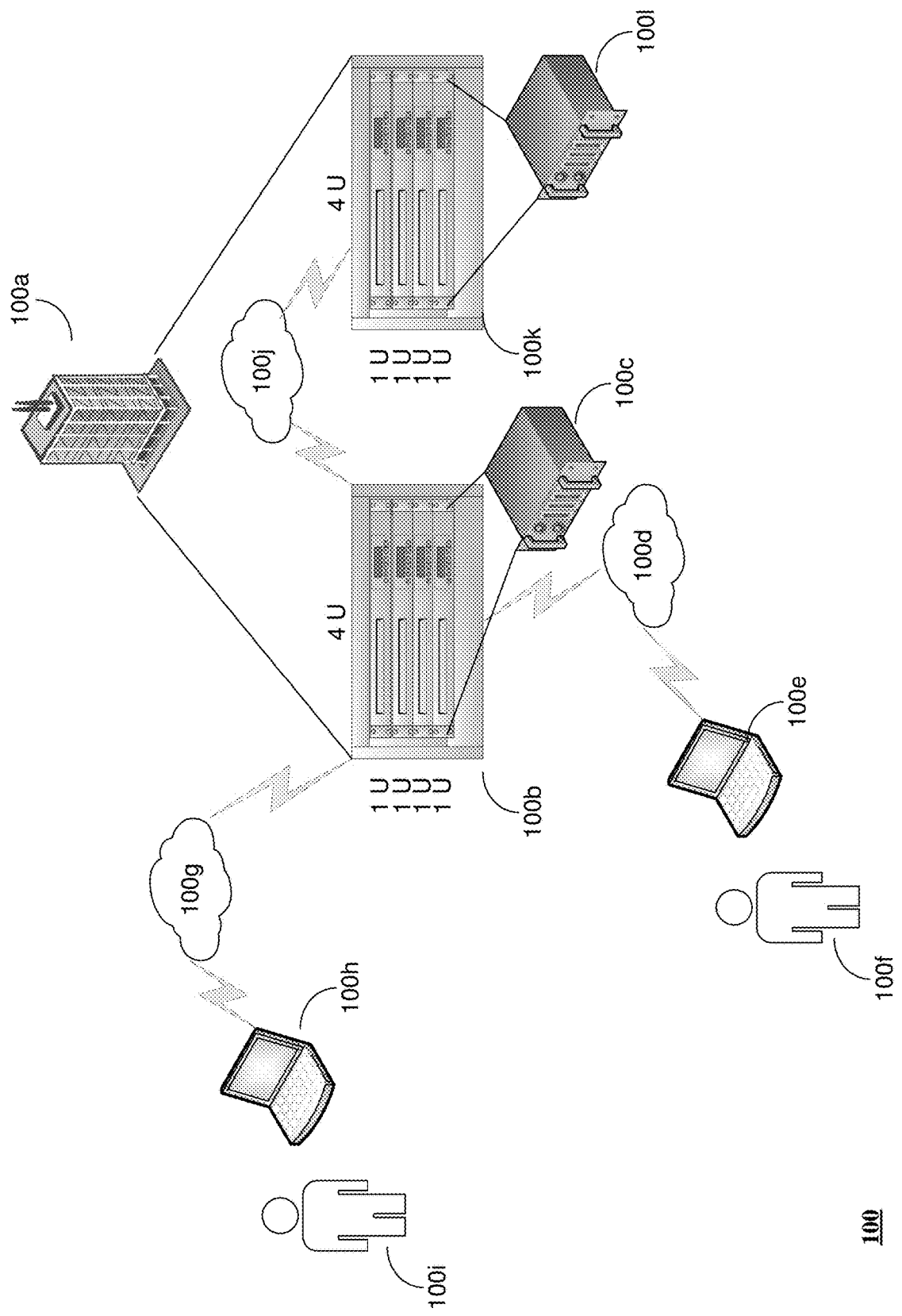

The subject disclosure describes, among other things, illustrative embodiments for receiving user-generated input from a client computing device associated with a user. The user-generated input initiates a request for a first reduced configuration associated with a group of services to be sent to the client computing device. Further, the embodiments can include obtaining a merged configuration associated with the group of services, obtaining staged system data associated with the group of services, and generating the first reduced configuration based on the merged configuration and the staged system data. Additional embodiments can include transmitting the first reduced configuration to the client computing device. The client computing device presents the first reduced configuration on a display associated with the client computing device to the user. Other embodiments are described in the subject disclosure.

One or more aspects of the subject disclosure include a device, comprising a processing system including a processor, and a memory that stores executable instructions that, when executed by the processing system, facilitate performance of operations. The operations can comprise receiving user-generated input from a client computing device associated with a user. The user-generated input initiates a request for a first reduced configuration associated with a group of services to be sent to the client computing device. Further operation can comprise obtaining a merged configuration associated with the group of services, obtaining staged system data associated with the group of services, and generating the first reduced configuration based on the merged configuration and the staged system data. Additional operations can comprise transmitting the first reduced configuration to the client computing device. The client computing device presents the first reduced configuration on a display associated with the client computing device to the user.

One or more aspects of the subject disclosure include a non-transitory machine-readable medium, comprising executable instructions that, when executed by a client computing device including a processor, facilitate performance of operations. The operations can comprise transmitting, over a communication network, a user-generated input to a first network device. The user-generated input initiates a request for a first reduced configuration associated with a group of services to the client computing device. The first network device obtains a merged configuration associated with the group of services. The first network device obtains staged system data associated with the group of services. The first network device generates the first reduced configuration based on the merged configuration and the staged system data. Further operations can comprise receiving, over the communication network, the first reduced configuration from the first network device, and presenting the first reduced configuration on a display associated with the client computing device.

One or more aspects of the subject disclosure include a method. The method can comprise receiving, by a network device including a processor, user-generated input from a client computing device associated with a user. The user-generated input initiates a request for a first reduced configuration associated with a group of services to be sent to the client computing device. Further, the method can comprise obtaining, by the network device, a merged configuration associated with the group of services, obtaining, by the network device, staged system data associated with the group of services, and generating, by the network device, the first reduced configuration based on the merged configuration and the staged system data. In addition, the method can comprise transmitting, by the network device, the first reduced configuration to the client computing device. The client computing device presents the first reduced configuration on a display associated with the client computing device to the user.

FIGS. 1A, 1B, 2A, 2B, 2C, 2D, and 2E are block diagrams illustrating example, non-limiting embodiments of a system functioning in accordance with various aspects described herein. Referring to FIG. 1, in one or more embodiments, system 100 generates a reduced configuration that is used to configure a service on a server for viewing/management by administration personnel. This includes system 100 allowing staging requests to be re-executed on a merged configuration and be "unmerged" in such a way that a reduced configuration can be generated for the purposes of brevity and simplicity for the administration personnel/user to alleviate cumbersome nature of viewing/managing the merged configuration. This allows the reduced configurations to be much smaller so they can be edited and understood more easily by a user and applied faster by the system 100.

In one or more embodiments, system 100 comprises rack equipment 100b located in an operations center 100a of telecommunications or data network provider. One of the pieces of equipment in the rack equipment 100b can include server 100c that provides one or more microservices/services. Further, system 100 can include rack equipment 100k communicatively coupled to rack equipment 100b over communication network 100j. One of the pieces of equipment in the rack equipment 100k can include a server 100l that provides one or more microservices/services. Administration personnel 100f, located on-site, can utilize a client computing device 100e to communicate with the server 100c over a communication network 100d to request a reduced configuration associated with a service or a group of services. In addition, administration personnel 100i, located off-site, can utilize a client computing device 100h to communicate with the server 100c, via the cloud, over a communication network 100g. Each of client computing device 100c and client computing device 100h can include, but not limited to, a laptop computer, a desktop computer, a tablet computer, a mobile device, a mobile phone, a smartphone, or any other computing device. Each of communication network 100d, communication network 100g, and communication network 100j can comprise a wired communication network, a wireless communication network, or combination thereof. In some embodiments, communication network 100g can comprise a portion of the Internet or a cloud-based communication network. In other embodiments, communication network 100j can be an intranet (or other closed communication network) that is located in one location or spanning multiple locations. In some embodiments, local administration personnel 100f can directly connect client computing device 100e to server 100c via a communication cable to create a communication link.

Figure 1B:
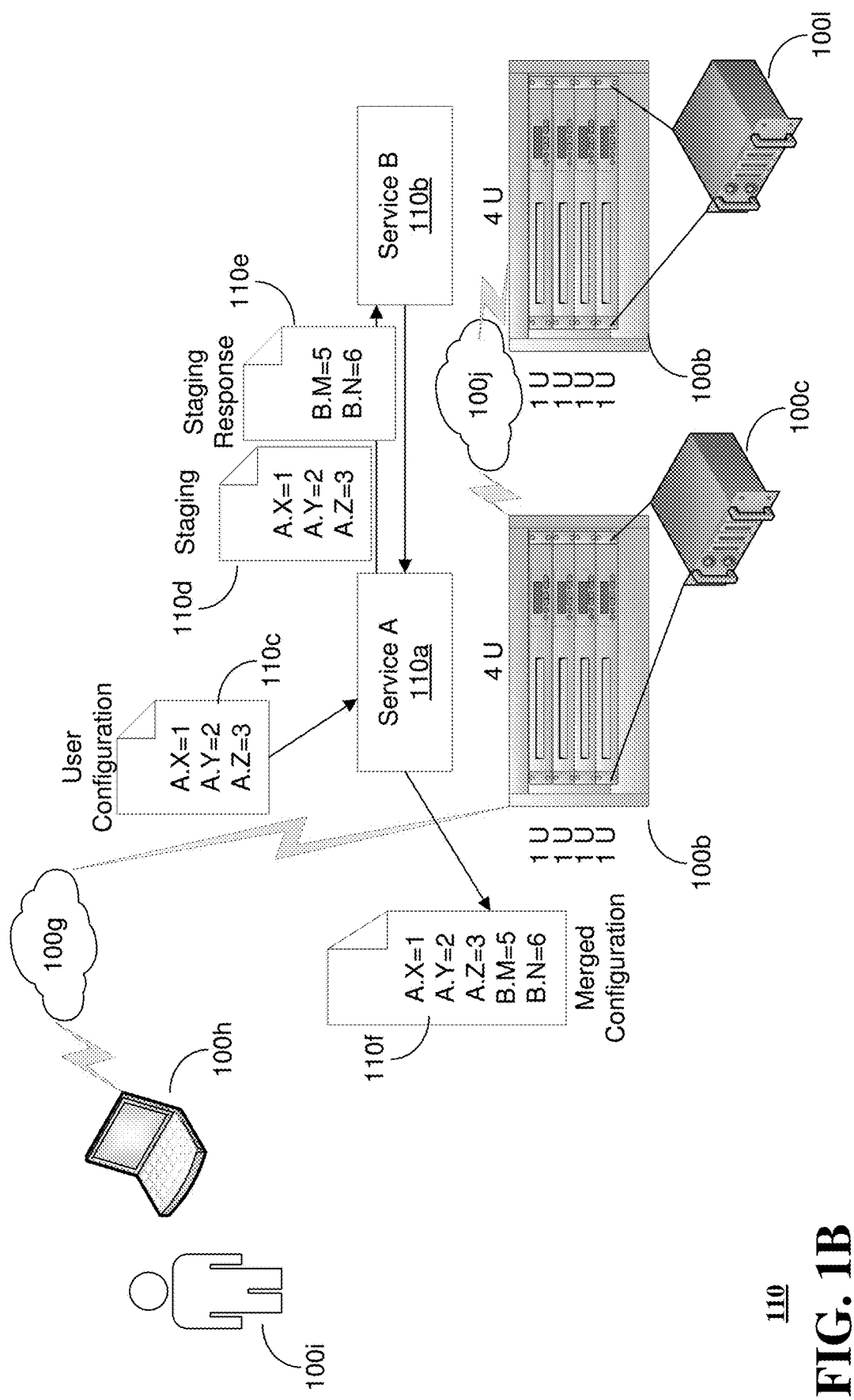

Referring to FIG. 1B, in one or more embodiments, staging system data can expand a user configuration to include additional system configuration that can be validated along with the user configuration. Administration personnel 100i can communicate with server 100c via client computing device 100h over communication network 100g. Server 100c can be associated with service A 110a. Further, server 100l can be associated with service B 110b. The administration personnel 100i via client computing device 100h can provide server 100c with a user request for service A 110a. The user request can include a user configuration 110c. Server 100c can determine that service A can impact service B. Thus, server 100c can generate staging data 110d to transmit to server 100l. In response, the server 100l can send a staging response 110e to server 100c. Server 100c can then generate a merged configuration 110f that can include the user configuration and the staging system data.

Referring to FIG. 2A, in one or more embodiments, staged data is traditional used to provide system data that does not override a user request. The series of configurations 200 can provision an object of a system that can result in the system provisioning other associated objects with their expected defaults. Administration personnel via client computing device can provide a user configuration 200a with a user request for provisioning the system. In response to receiving user configuration 200a, the system can generate staged system data 200b. Further, the system can generate a final configuration (merged configuration) 200c.

Referring to FIG. 2B, in one or more embodiments, the series of configurations 210 can include some parameters in the user configuration having values that override values of the parameters in the staged system data. The user configuration 210a can provision a monitor service of port 3 and provision configuration parameters such as the min power to a value of 5 and the state as disabled. The system can obtain staged system data 210b that has a min power value of 3, max power value of 10, state enabled, and alarming enabled. The min power and state configuration parameters of the user configuration 210a have values different than the min power and state configuration parameters of the staged system data. Thus, the values of the min power and state parameters of the user configuration override the values of the min power and the state configuration parameters of the stated system data when the system generates the final configuration (merged configuration) 210c.

In one or more embodiments, administration personnel via client computing device can request a reduced configuration to view/manage. In response to the request, the system can obtain the merged configuration 210d, and obtain the staged system data 210c, and based on both the merged configuration 210d and the staged system data 210e, generate the reduced configuration 210f. The staged system data 210e includes a complete set of default values for the configuration parameters. Further, the system can remove any default parameters from the merged configuration to generate the reduced configuration for the administration personnel to more easily view/manage.

Referring to FIG. 2C, in one or more embodiments, the series of configuration 220 can show that in some instances the merged configuration 220a can be identical to the reduced configuration 220c. That is, the merged configuration 220a comprises invoking a monitor service on port 3 with a min power value of 5, a max power value of 10, and the state disabled. Further, the staged system data has a default value of enabled for the alarming parameter. The system determines that the merged configuration 200a already has values provided for the min-power, max-power, and state configuration parameters. When providing the staging system data, the system avoids providing the portions of the staging system data already in the merged configuration 220a and only provides portions of the staging system data for the configuration parameter(s) that have been omitted (alarming enabled). If this occurs, the system cannot use the staging system data to unmerge and remove the default parameters from the merged configuration to generate the reduced configuration 220c. Thus, the reduced configuration 220c includes monitoring port 3 with a min power value of 5, max power value 10, and state value of disabled, which is identical to the merged configuration.

Referring to FIG. 2D, in one or more embodiments, the series of configurations 230 illustrate template expansion. That is, based on the user configuration 230a, a template is identified and default values for configuration parameters are provided by the system. The user configuration 230a can include invoking the service of creating a card slot 1 for part no. ABC123. In response, the system obtains the staged system data 230b that creates card slot 1 that includes monitor port 3 with min power value 3, max power 10, state enable, and alarming enabled as well as creating card slot 1 that includes monitor port 4, min power 4, max power 11, state enabled, and alarming enabled. Further, the system generates the final configuration 230c based on the user configuration and the staged system data. The final configuration 230c includes all values for the parameters from the staged system data 230b. Subsequently, when administration personnel via a client computing device requests a reduced configuration, the system can obtain the merged configuration 230d and obtain the staged system data 230e to generate the reduced configuration 230f. Note, to generate the reduced configuration 230f, the system omitted part no ABC123 from the staged system data. In some embodiments, a portion of the staged system data is omitted (e.g., part no ABC123) to generate the merged configuration data so that it is not removed and acts as a trigger to generate the reduced configuration. However, in situations when such a trigger is not needed, default values of configuration parameters should be provided every time a reduced configuration is generated so that if the user configuration does not provide any values for a configuration parameter, then the staged system data can be used to add the default values to the reduced configuration.

Referring to FIG. 2E, in one or more embodiments, the series of configurations 240 show a merged configuration 240a that incorporates user configuration data overriding default values for some configuration parameters. The merged configuration 240a includes invoking a service of monitoring part no ABC123 in slot 1 on port 3 with a min power value of 10, a max power value of 20, state enabled, and alarming enabled and on port 4 with min power value 4, max power value 11, state disabled, and alarming disabled. Further, staged system data 240b can provide default values for monitoring part no ABC123 in slot 1 on port 3 with min power 5, max power 10, state disabled, and alarming enabled as well as on port 4 with min power 4, max power 11, state disabled, and alarming enabled. Thus, the merged configuration 240a overrides the default values in the staged system data for the min power, max power and state on port 3 and alarming on port 4. Based on the merged configuration 240a and the staged system data 240b, the system generates the reduced configuration that includes the values of configurations parameters that were overridden by the merged configuration 240a (e.g., min power, max power, and state on port 3 as well as alarming on port 4).

In one or more embodiments, the system's staged system data in response to provisioning may be different than the staged system data in response to unmerging. This can be true if the obtaining of staged system data is omitted when not needed in provisioning. Doing so can improve system response because staged system data that may not be used in provisioning (e.g., all default values for configuration parameters have already been provided) means there is less work for the system to do to generate the merged configuration. If this is true, it may be beneficial to have a flag that indicates the "type" of staging request being performed. This allows "unmerge" staging requests to behave differently without impacting system performance in provisioning scenarios.

In one or more embodiments, a trigger event can cause a system or a server within a system to generate reduced configuration and transmit the reduced configuration to a client computing device for a user to view/manage. A trigger event can include or not limited to an alarm, a change in state, a failure of a first service associated with the group of services, a completion of a second service associated with the group of services, or a combination thereof. In other embodiments, the system/server can be provisioned to periodically or at different time intervals to generate a reduced configuration and transmit the reduced configuration to a client computing device for a user to view/manage. In such embodiments, the system/server can initiate a timer in response to transmitting a reduced configuration to the client computing device, and in response to expiration of the timer, generate and transmit another reduced configuration to the client computing device for a user to view/manage. This process can repeat until the system/server is provisioned otherwise.

Figure 3A:
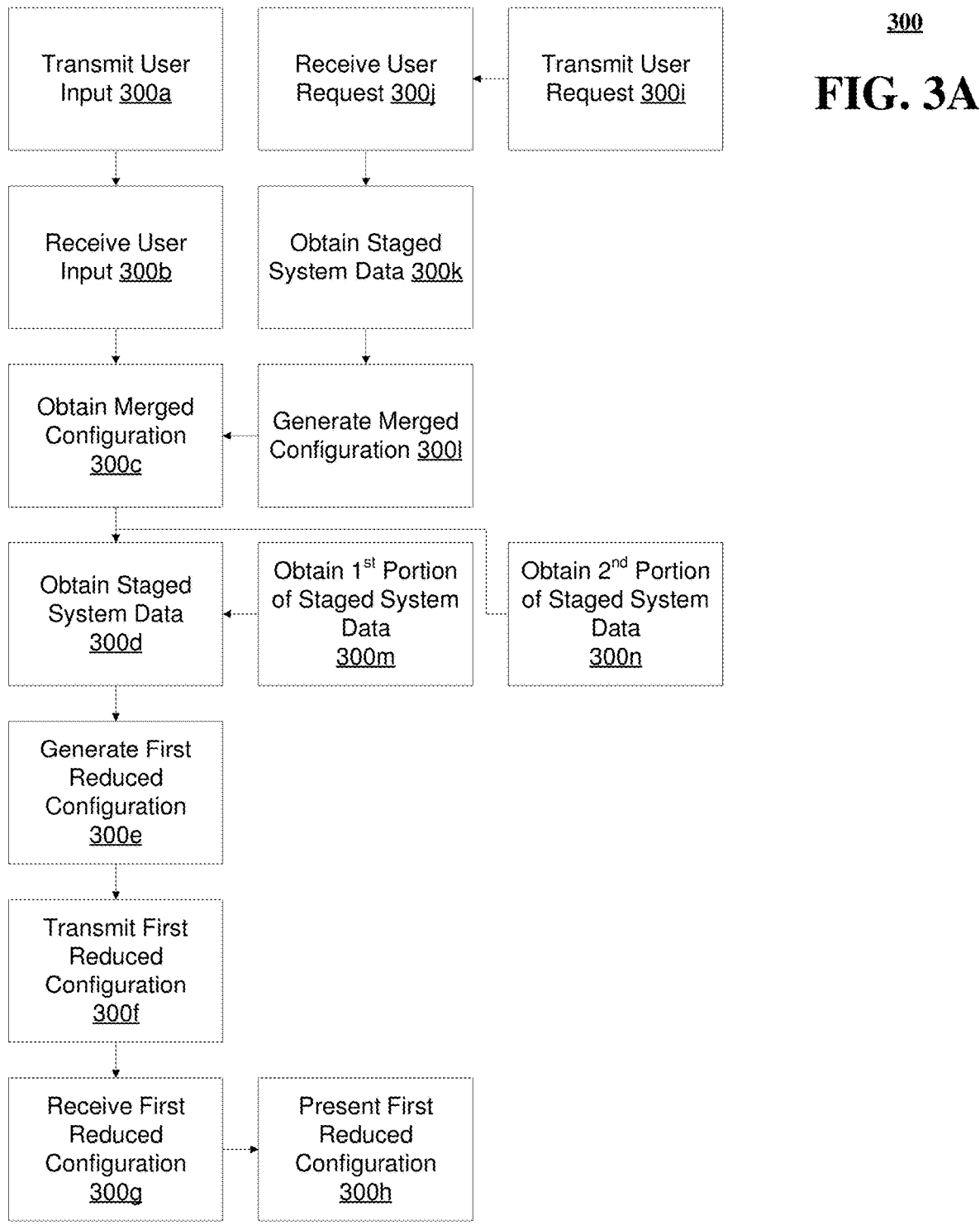
FIGS. 3A, 3B, 3C, and 3D depict illustrative embodiments of a method in accordance with various aspects described herein.

FIGS. 3A, 3B, 3C, and 3D depict illustrative embodiments of a method in accordance with various aspects described herein. Referring to FIG. 3A, in one or more embodiments, aspects of method 300 can be implemented by a client computing device associated with a user (e.g., administration personnel) or a server associated with a service or a group of services to generate a reduced configuration for the user to view/manage. The method 300 can include a client computing device, at 300a, transmitting user-generated input to the server. The user-generated input indicates to the server to initiate a request for and/or provide a first reduced configuration associated with a group of services to the client computing device. Further, the method 300 can include the server, at 300b, receiving the user-generated input from the client computing device. In addition, the method 300 can include the server, at 300c, obtaining a merged configuration associated with the group of services. In some embodiments, the merged configuration can be obtained from a running database (e.g., datastore). In other embodiments, the merged configuration can be obtained from a candidate database (e.g., datastore), offline from a file, or from a website via a uniform resource locator (URL). Also, the method 300 can include the server, at 300d, obtaining staged system data associated with the group of services. Further, the method 300 can include the server, at 300e, generating the first reduced configuration based on the merged configuration and the staged system data. In addition, the method 300 can include the server, at 300f, transmitting the first reduced configuration to the client computing device. Also, the method 300 can include the client computing device, 300g, receiving the first reduced configuration from the server. Further, the method 300 can include the client computing device, at 300h, presenting the first reduced configuration on a display associated with the client computing device to the user.

In one or more embodiments, the method 300 can include client computing device, at 300i, transmitting a user request associated with the group of services to the server. The user request includes a user configuration associated with the group of services. Further, the method 300 can include the server, at 300j, receiving a user request associated with the group of services from the client computing device. In addition, the method 300 can include the server, at 300k, obtaining the staged system data. Also, the method 300 can include the server, at 300l, generating the merged configuration based on the user configuration and the staged system data.

In one or more embodiments, the method 300 can include the server, at 300m, obtaining a first portion of the staged system data from a first network device (e.g., server).

Further, the method 300 can include the server, at 300n, obtaining a second portion of the staged system data from a second network device (e.g., another server). In some embodiments, the obtaining of the staged system data comprises obtaining a first portion of the staged system data from a first network device and obtaining a second portion of the staged system data from a second network device. In other embodiments, the obtaining of the second portion of the staged system data from the second network device comprises obtaining the second portion of the staged system data over an intranet communication network from the second network device.

In one or more embodiments, the receiving of the user-generated input comprises receiving the user-generated input over a cloud-based communication network. In further embodiments, the transmitting of the first reduced configuration comprises transmitting the first reduced configuration to the client computing device over the communication network.

Figure 3B:
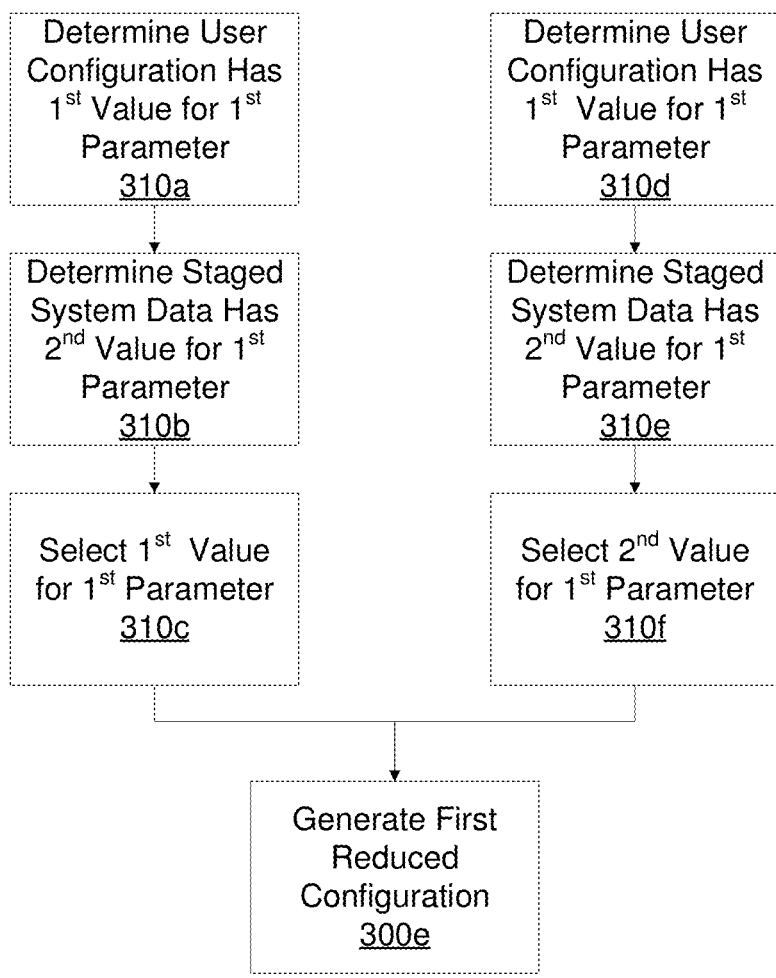

Referring to FIG. 3B, in one or more embodiments, aspects of method 310 can be implemented by a server associated with a service or a group of services to determine a reduced configuration to include values for configuration parameters from a user configuration or values from staged system data. The method 310 can include the server, at 310a, determining that the user configuration includes a first value associated with a first configuration parameter. Further, the method 310 can include the server, at 310b, determining that the staged system data includes a second value associated with the first configuration parameter. In addition, the method 310 can include, at 310c, selecting the first value for the first configuration parameter based on the user configuration and the staged system data. The method 310 can include the server, at 300e, generating of the first reduced configuration such that the first configuration parameter has the first value.

In one or more embodiments, the method 310 can include the server, at 310d, determining that the user configuration includes a first value associated with a first configuration parameter. Further, the method 310 can include the server, at 310c, determining that the staged system data includes a second value associated with the first configuration parameter. In addition, the method 300 can include, at 310f, selecting the second value for the first configuration parameter based on the user configuration data and the staged system data. The method 310 can include the server, at 300e, generating of the first reduced configuration such that the first configuration parameter has the second value.

Figure 3C:
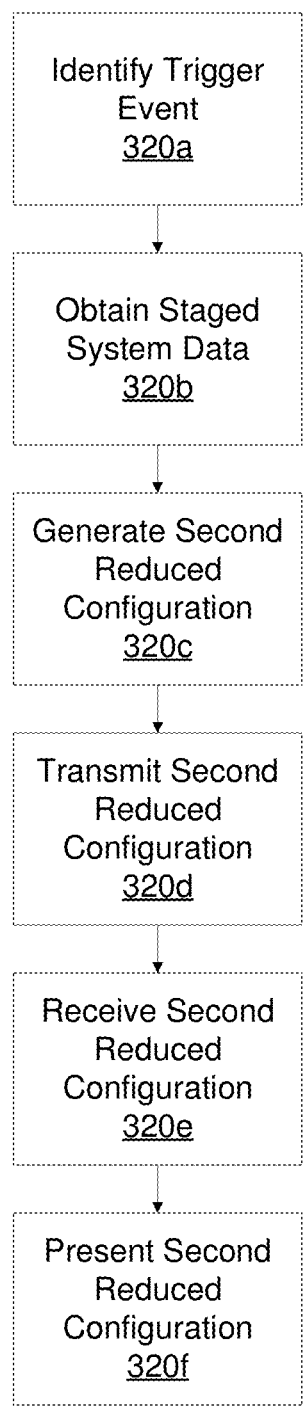

Referring to FIG. 3C, in one or more embodiments, aspects of method 320 can be implemented by a server associated with a service or a group of services or a client computing device to generate and transmit a reduced configuration to a client computing device for a user to view/manage in response to identifying a trigger event. The method 320 can include the server, at 320a, identifying a trigger event. Further, the method 320 can include the server, at 320b, obtaining the staged system data associated with the group of services. In addition, the method 320 can include the server 320c, generating a second reduced configuration based on the merged configuration and the staged system data. Also, the method 320 can include the server, at 320d, transmitting the second reduced configuration to the client computing device. Further, the method 320 can include the client computing device, at 320e, receiving the second reduced configuration. In addition, the method 320 can include the client computing device, at 320f, presenting the second reduced configuration on the display associated with the client computing device to the user. The trigger event can be, but not limited to an alarm, a change in state, a failure of a first service associated with the group of services, a completion of a second service associated with the group of services, or a combination thereof.

Figure 3D:
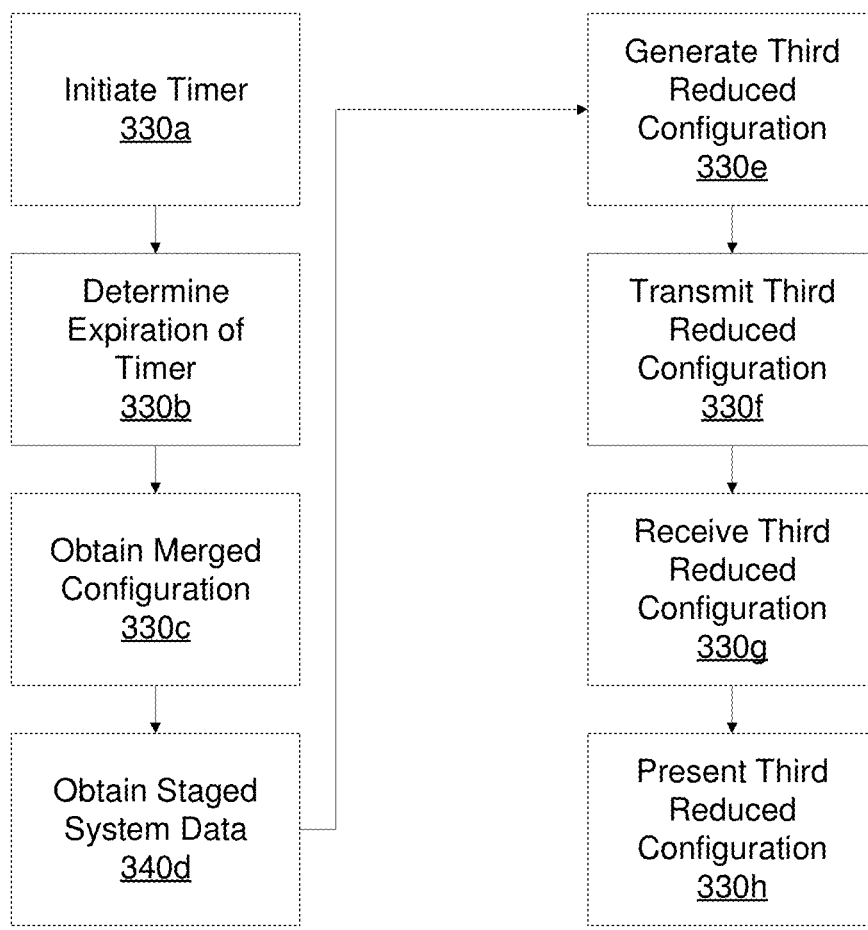

Referring to FIG. 3D, in one or more embodiments, aspects of method 330 can be implemented by a server associated with a service or a group of services or a client computing device to provide a reduced configuration periodically or at different time intervals to a client computing device for a user to view/manage. The method 330 can include the server, at 330a, initiating a timer in response to transmitting the first reduced configuration to the client computing device. Further, the method 330 can include the server, at 330b, determining an expiration of the timer resulting in a determination. In addition, the method 330 can include the server, at 330c, obtaining the merged configuration associated with the group of services based on the determination. Also, the method 330 can include the server, at 330d, obtaining the staged system data associated with the group of services based on the determination. Further, the method 330 can include the server, at 330e, based on the determination, generating a third reduced configuration based on the merged configuration and the staged system data. In addition, the method 330 can include the server, at 330f, based on the determination, transmitting the third reduced configuration to the client computing device. Also, the method 330 can include the client computing device, at 330g, receiving the third reduced configuration from the server. Further, the method 330 can include the client computing device, at 300h, presenting the third reduced configuration on the display associated with the client computing device to the user.

While for purposes of simplicity of explanation, the respective processes are shown and described as a series of blocks in FIGS. 3A-3D, it is to be understood and appreciated that the claimed subject matter is not limited by the order of the blocks, as some blocks may occur in different orders and/or concurrently with other blocks from what is depicted and described herein among FIGS. 3A-3D. Moreover, not all illustrated blocks may be required to implement the methods described herein. Note, one or more blocks can be performed in response to one or more other blocks among those shown in FIGS. 3A-3D.

Further, some portions of embodiments can be combined with portions of other embodiments.

Figure 4:
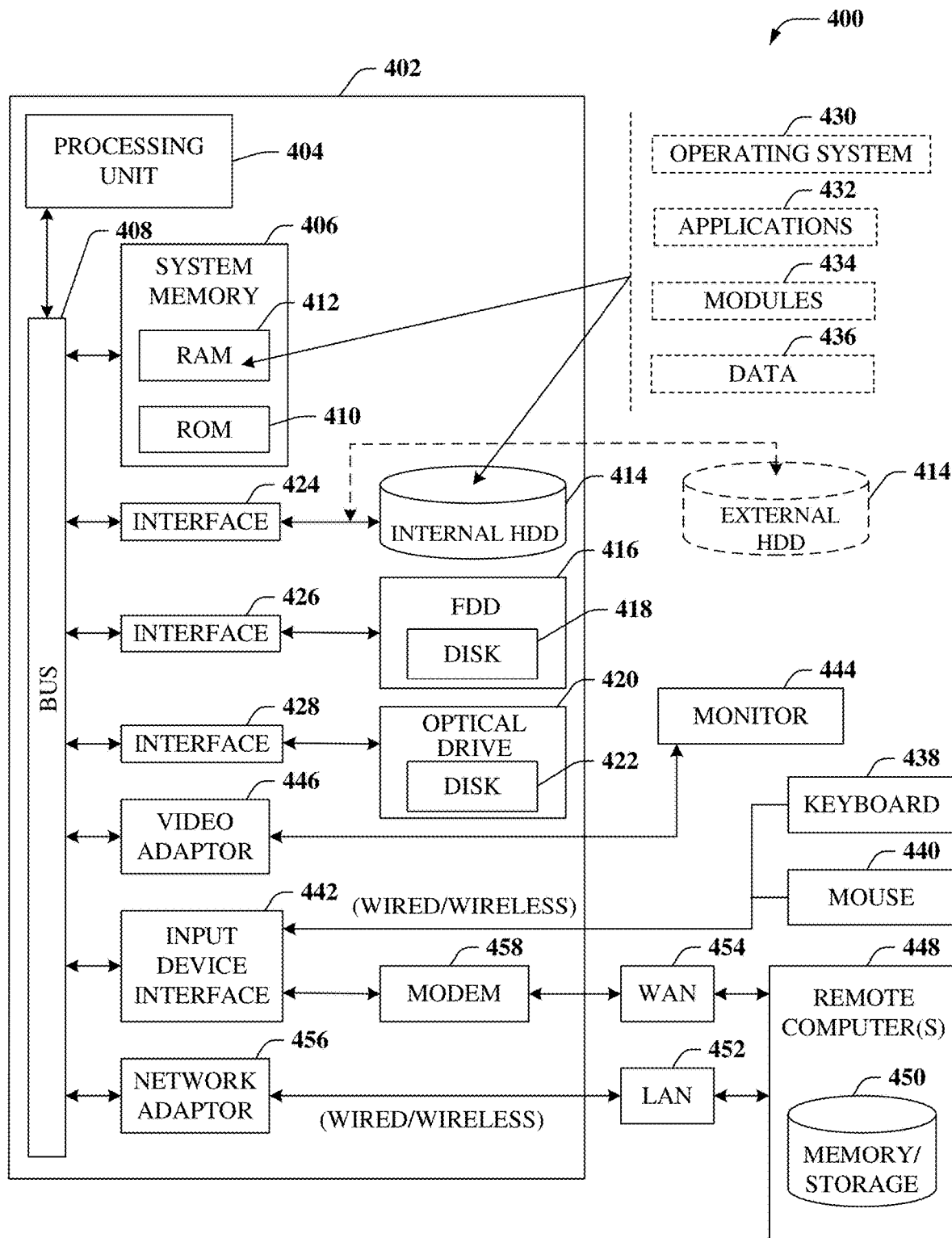
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in computing device described herein. Each of these devices can be implemented via computer-executable instructions that can run on one or more computers, and/or in combination with other program modules and/or as a combination of hardware and software. For example, computing environment 400 can facilitate in whole or in part generating a reduced configuration. Further, each of the server 100c, client computing device 100e, client computing device 100h, and server 1001 can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
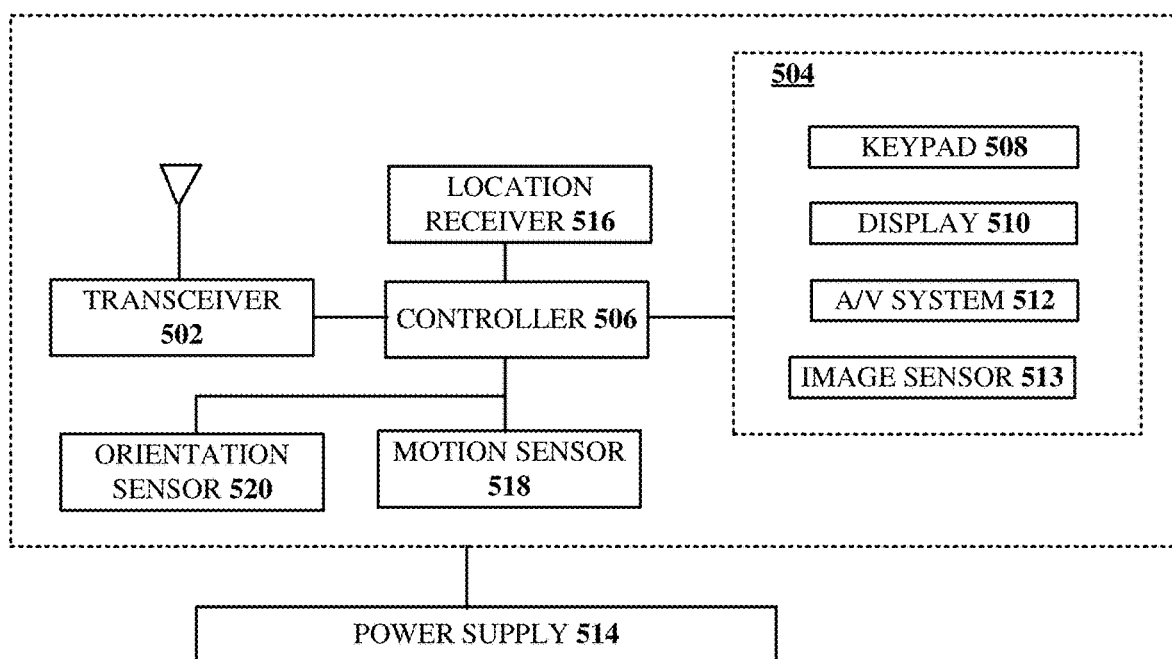
FIG. 5 is a block diagram of an example, non-limiting embodiment of a mobile network platform in accordance with various aspects described herein.

Turning now to FIG. 5, an illustrative embodiment of a communication device 500 is shown. Communication device 500 can facilitate in whole or in part generating a reduced configuration. Further, each of the server 100c, client computing device 100e, client computing device 100h, and server 1001 can comprise communication device 500.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VOIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high-volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgment requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
    receiving user-generated input from a client computing device associated with a user, wherein the user-generated input initiates a request for a first reduced configuration associated with a group of services to be sent to the client computing device;
    determining that the user-generated input initiating the request for the first reduced configuration is a first trigger event for generating the first reduced configuration resulting in a determination;
    based on the determination, obtaining a merged configuration associated with the group of services;
    obtaining first staged system data associated with the group of services, wherein the first staged system data comprises a first value for a first configuration parameter associated with a first service of the group of services and a second value for a second configuration parameter associated with a second service of the group of services, wherein the merged configuration comprises a third value for the first configuration parameter, wherein the third value for the first configuration parameter was provided by a user configuration, wherein the merged configuration comprises the second value for the second configuration parameter;
    generating the first reduced configuration based on the merged configuration and the first staged system data, wherein the first reduced configuration comprises the third value for the first configuration parameter; and transmitting the first reduced configuration to the client computing device.

2. The device of claim 1, wherein the operations further comprise:
prior to the receiving the user-generated input,
(i) receiving a user request associated with the group of services, wherein the user request includes the user configuration associated with the group of services;
(ii) obtaining a second staged system data; and
(iii) generating the merged configuration based on the user configuration and the second staged system data.

3. The device of claim 2, wherein the operations further comprise:
determining that the user configuration includes the third value associated with the first configuration parameter;
determining that the first staged system data includes the first value associated with the first configuration parameter; and
selecting the third value for the first configuration parameter based on the user configuration and the first staged system data, wherein the generating of the merged configuration comprises generating the merged configuration such that the first configuration parameter has the third value.

4. The device of claim 2, wherein the operations further comprise:
determining that the user configuration includes no value for the second configuration parameter;
determining that the first staged system data includes the second value associated with the second configuration parameter; and
selecting the second value for the second configuration parameter based on the user configuration and the first staged system data, wherein the generating of the merged configuration comprises generating the merged configuration such that the second configuration parameter has the second value.

5. The device of claim 1, wherein the obtaining of the first staged system data comprises obtaining the first staged system data from a template selected based on the user configuration.

6. The device of claim 5, wherein the transmitting of the first reduced configuration comprises transmitting the first reduced configuration to the client computing device over a cloud-based communication network.

7. The device of claim 1, wherein the obtaining of the first staged system data comprises obtaining a first portion of the first staged system data from a first network device and obtaining a second portion of the first staged system data from a second network device.

8. The device of claim 7, wherein the obtaining of the second portion of the first staged system data from the second network device comprises obtaining the second portion of the first staged system data over an intranet communication network from the second network device.

9. The device of claim 1, wherein the operations further comprise:
in response to identifying a second trigger event,
(i) obtaining a third staged system data associated with the group of services;
(ii) generating a second reduced configuration based on the merged configuration and the third staged system data; and
(iii) transmitting the second reduced configuration to the client computing device.

10. The device of claim 9, wherein the second trigger event is associated with an alarm, a change in state, a failure of a third service associated with the group of services, a completion of a fourth service associated with the group of services, or a combination thereof.

11. The device of claim 1, wherein the operations further comprise:
initiating a timer in response to transmitting the first reduced configuration to the client computing device;
determining an expiration of the timer resulting in a determination;
based on the determination:
obtaining a second merged configuration associated with the group of services;
obtaining a fourth staged system data associated with the group of services;
generating a third reduced configuration based on the second merged configuration and the fourth staged system data; and
transmitting the third reduced configuration to the client computing device.

12. A non-transitory machine-readable medium, comprising executable instructions that, when executed by a client computing device including a processor, facilitate performance of operations, the operations comprising:
transmitting, over a communication network, a user-generated input to a first network device, wherein the user-generated input initiates a request for a first reduced configuration associated with a group of services to the client computing device, wherein the first network device determines that the user-generated input initiating the request for the first reduced configuration is a trigger event for generating the first reduced configuration resulting in a determination, wherein the first network device obtains a merged configuration associated with the group of services based on the determination, wherein the first network device obtains first staged system data associated with the group of services, wherein the first staged system data comprises a first value for a first configuration parameter associated with a first service of the group of services and a second value for a second configuration parameter associated with a second service of the group of services, wherein the merged configuration comprises a third value for the first configuration parameter, wherein the third value for the first configuration parameter was provided by a user configuration, wherein the merged configuration comprises the second value for the second configuration parameter, and wherein the first network device generates the first reduced configuration based on the merged configuration and the first staged system data, wherein the first reduced configuration comprises the third value for the first configuration parameter;
receiving, over the communication network, the first reduced configuration from the first network device; and
presenting the first reduced configuration on a display associated with the client computing device.

13. The non-transitory machine-readable medium of claim 12, wherein the operations further comprise, prior to the transmitting the user-generated input, transmitting, over the communication network, a user request associated with the group of services to the first network device, wherein the user request includes the user configuration associated with the group of services, wherein the first network device obtains second staged system data, and wherein the first network device generates the merged configuration based on the user configuration and the second staged system data.

14. The non-transitory machine-readable medium of claim 13, wherein the first network device determines that the user configuration includes the third value associated with the first configuration parameter, wherein the first network device determines that the first staged system data includes the first value associated with the first configuration parameter, wherein the first network device selects the third value for the first configuration parameter based on the user configuration and the first staged system data, and wherein generating of the merged configuration by the first network device includes the generating of the merged configuration with the first configuration parameter having the third value.

15. The non-transitory machine-readable medium of claim 13, wherein the first network device determines that the user configuration includes no value associated with the second configuration parameter, wherein the first network device determines that the first staged system data includes the second value associated with the second configuration parameter, wherein the first network device selects the second value for the second configuration parameter based on the user configuration and the first staged system data, wherein generating of the merged configuration by the first network device includes the generating of the merged configuration with the second configuration parameter having the second value.

16. The non-transitory machine-readable medium of claim 12, wherein obtaining of the first staged system data comprises obtaining a first portion of the first staged system data from the first network device and obtaining a second portion of the first staged system data from a second network device.

17. A method, comprising:
receiving, by a network device including a processor, user-generated input from a client computing device associated with a user, wherein the user-generated input initiates a request for a first reduced configuration associated with a group of services to be sent to the client computing device;
determining, by the network device, that the user-generated input initiating the request for the first reduced configuration is a trigger event for generating the first reduced configuration resulting in a determination;
based on the determination, obtaining, by the network device, a merged configuration associated with the group of services;
obtaining, by the network device, first staged system data associated with the group of services, wherein the first staged system data comprises a first value for a first configuration parameter associated with a first service of the group of services and a second value for a second configuration parameter associated with a second service of the group of services, wherein the merged configuration comprises a third value for the first configuration parameter, wherein the third value for the first configuration parameter was provided by a user configuration, wherein the merged configuration comprises the second value for the second configuration parameter;
generating, by the network device, the first reduced configuration based on the merged configuration and the first staged system data, wherein the first reduced configuration comprises the third value for the first configuration parameter; and
transmitting, by the network device, the first reduced configuration to the client computing device.

18. The method of claim 17, further comprising:
in response to identifying, by the network device, a trigger event,
(i) obtaining, by the network device, a second staged system data associated with the group of services;
(ii) generating, by the network device, a second reduced configuration based on the merged configuration and the second staged system data; and
(iii) transmitting, by the network device, the second reduced configuration to the client computing device.

19. The method of claim 18, wherein the trigger event is associated with an alarm, a change in state, a failure of a third service associated with the group of services, a completion of a fourth service associated with the group of services, or a combination thereof.

20. The method of claim 17, further comprising:
initiating, by the network device, a timer in response to transmitting the first reduced configuration to the client computing device;
determining, by the network device, an expiration of the timer resulting in a determination;
based on the determination:
obtaining, by the network device, a second merged configuration associated with the group of services;
obtaining, by the network device, a third staged system data associated with the group of services;
generating, by the network device, a second reduced configuration based on the second merged configuration and the third staged system data; and
transmitting, by the network device, the second reduced configuration to the client computing device.

* * * * *